(12) United States Patent
Takasugi et al.

(10) Patent No.: US 6,989,968 B2
(45) Date of Patent: Jan. 24, 2006

(54) MAGNETIC HEAD SUSPENSION WITH A LOAD BEAM STRUCTURE

(76) Inventors: Satoru Takasugi, c/o SUNCALL CORPORATION, 14, Umezu Nishiura-cho, Ukyo-ku, Kyoto-shi, Kyoto-fu (JP); Hiroko Fujii, c/o SUNCALL CORPORATION, 14, Umezu Nishiura-cho, Ukyo-ku, Kyoto-shi, Kyoto-fu (JP); Tomohiko Kanemura, c/o SUNCALL CORPORATION, 14, Umezu Nishiura-cho, Ukyo-ku, Kyoto-shi, Kyoto-fu (JP)

( * ) Notice: Subject to any disclaimer, the term of this patent is extended or adjusted under 35 U.S.C. 154(b) by 168 days.

(21) Appl. No.: 10/462,591

(22) Filed: Jun. 17, 2003

(65) Prior Publication Data

US 2004/0095681 A1    May 20, 2004

(30) Foreign Application Priority Data

Jun. 19, 2002  (JP)  ............................. 2002-178620
Jun. 11, 2003  (JP)  ............................. 2003-166127

(51) Int. Cl.
*G11B 5/48*    (2006.01)
*G11B 21/16*   (2006.01)

(52) U.S. Cl. .............. 360/244.2; 360/244.8; 360/244.9; 360/294.4

(58) Field of Classification Search .......... 360/244.2, 360/244.8, 244.9, 294.4
See application file for complete search history.

(56) References Cited

U.S. PATENT DOCUMENTS

| | | | | |
|---|---|---|---|---|
| 3,931,641 | A | | 1/1976 | Watrous .................... 360/245.5 |
| 6,043,956 | A | * | 3/2000 | Hanya et al. ............. 360/244.9 |
| 6,141,187 | A | * | 10/2000 | Wong et al. ............. 360/244.8 |
| 6,271,996 | B1 | * | 8/2001 | Houk et al. ............... 360/244.9 |
| 6,307,719 | B1 | * | 10/2001 | Mallary .................... 360/294.7 |
| 6,731,465 | B2 | * | 5/2004 | Crane et al. ............. 360/244.3 |
| 6,735,050 | B2 | * | 5/2004 | Takagi et al. ............ 360/244.9 |
| 2001/0008475 | A1 | * | 7/2001 | Takagi et al. ............ 360/244.8 |

FOREIGN PATENT DOCUMENTS

| | | |
|---|---|---|
| JP | 10-31873 | 2/1998 |
| JP | 2001-143422 | 5/2001 |
| JP | 2001-155458 | 6/2001 |

* cited by examiner

*Primary Examiner*—Jefferson Evans
(74) *Attorney, Agent, or Firm*—Sterne, Kessler, Goldstein & Fox P.L.L.C.

(57) ABSTRACT

A proximal end region of a load beam is provided with a proximal-end widthwise beam extending in the width direction and a pair of proximal-end lengthwise beams respectively extending from the opposite ends of the proximal-end widthwise beam towards a distal end of the load beam, while an intermediate region of the load beam is provided with a pair of intermediate lengthwise beams extending from the distal ends of the pair of proximal-end lengthwise beams towards the distal end of the load beam. The proximal-end lengthwise beams have an angle of inclination relative to the longitudinal center axis of the load beam greater than the angle of inclination of the intermediate lengthwise beams relative to the longitudinal center axis of the load beam.

15 Claims, 8 Drawing Sheets

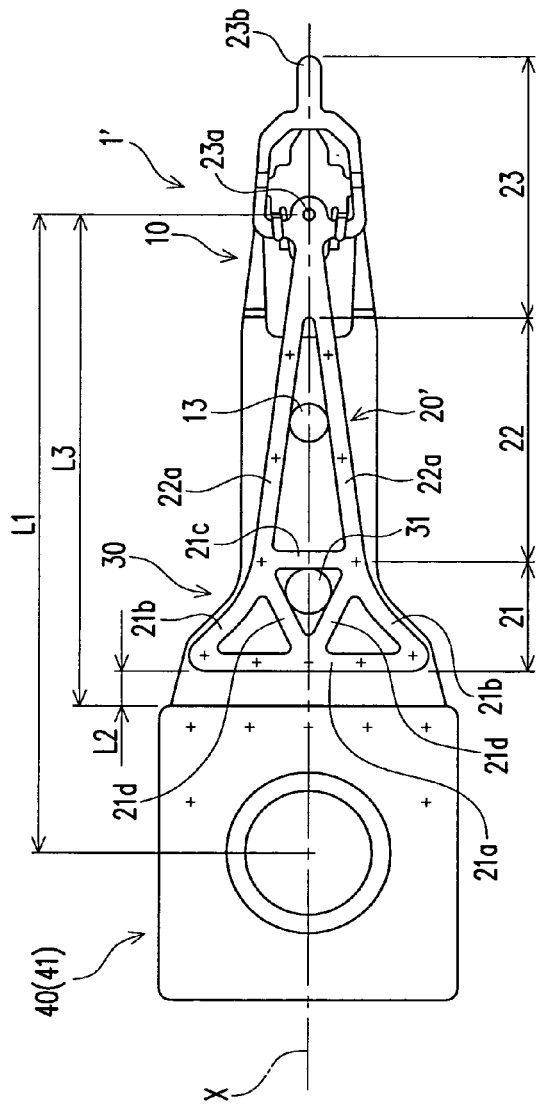
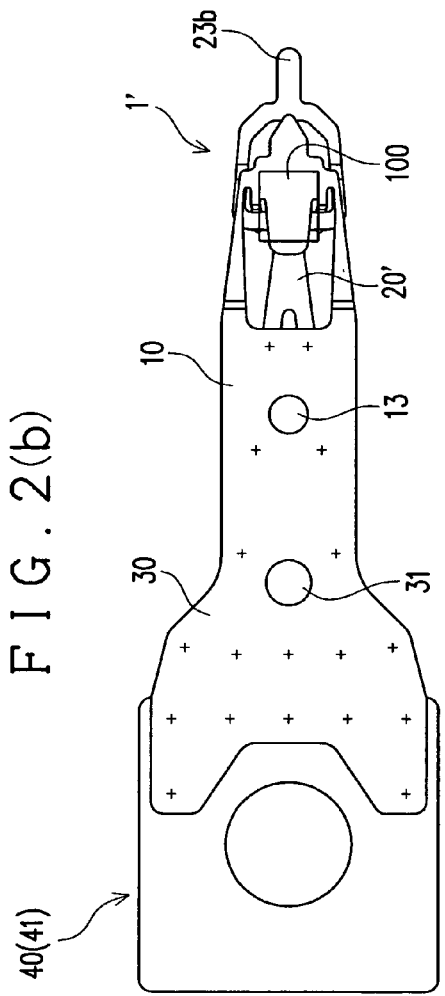
FIG. 2(a)
FIG. 2(b)

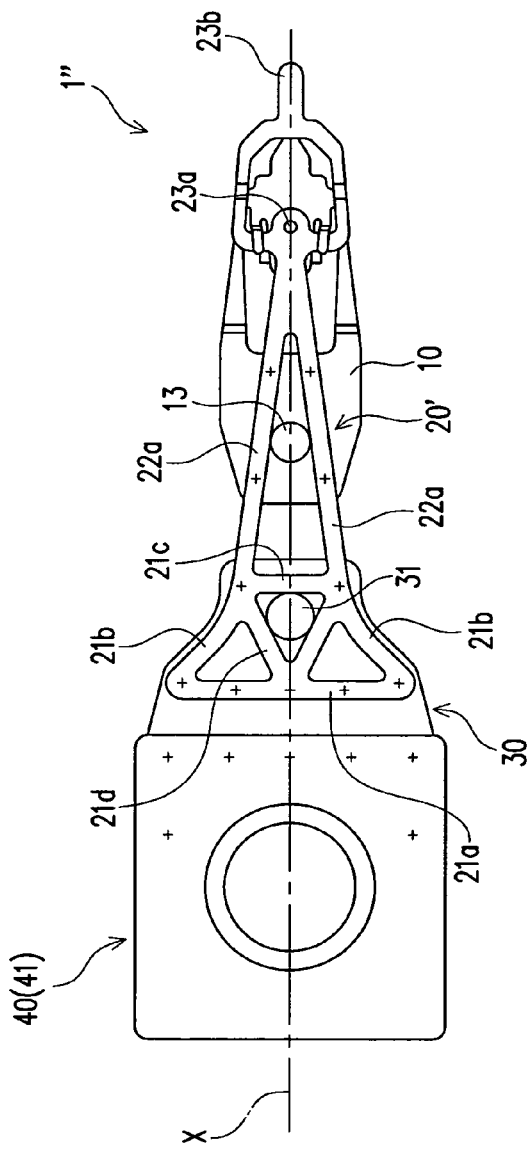
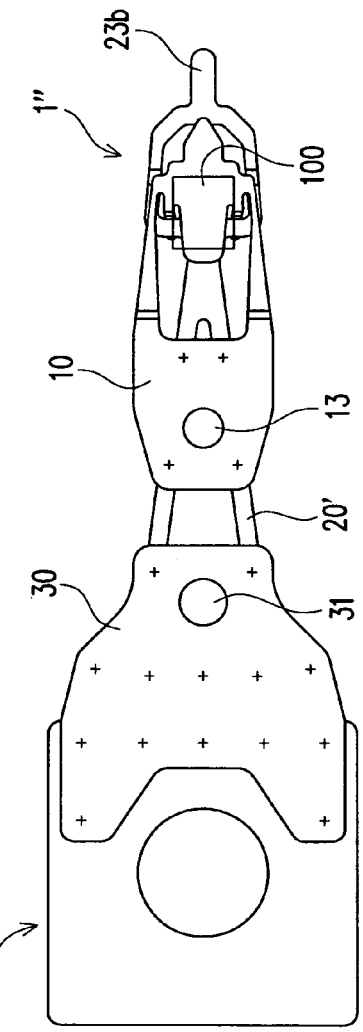
F I G. 3(a)
F I G. 3(b)

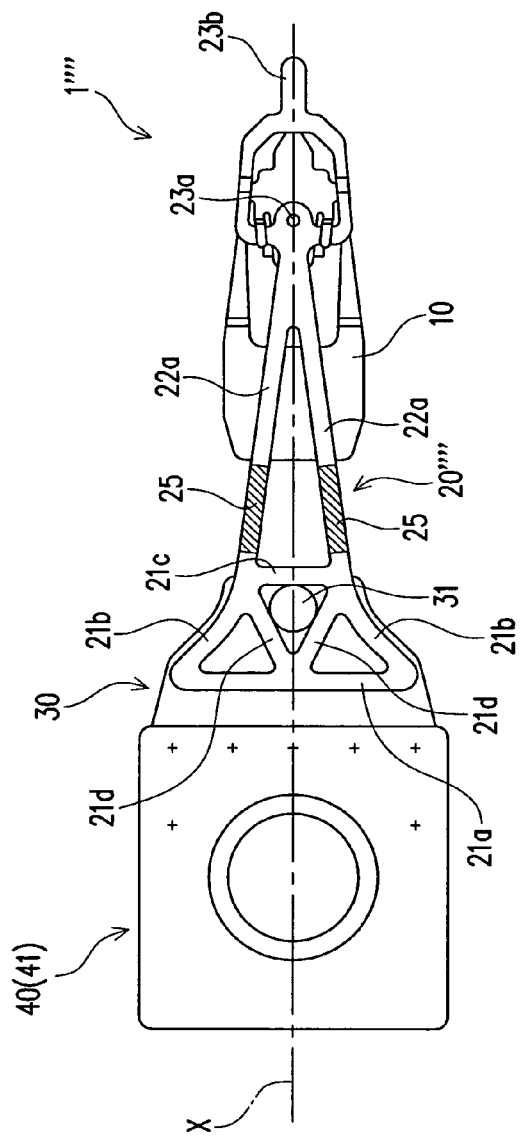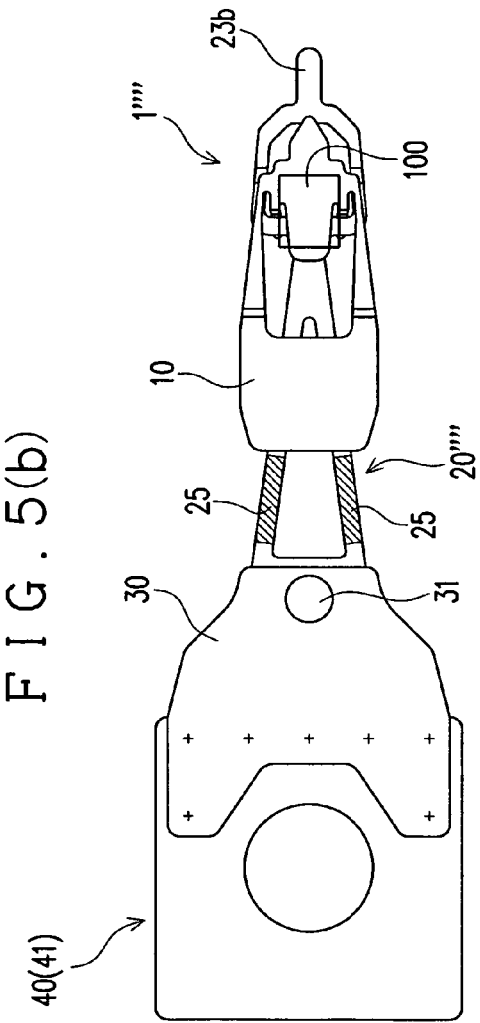

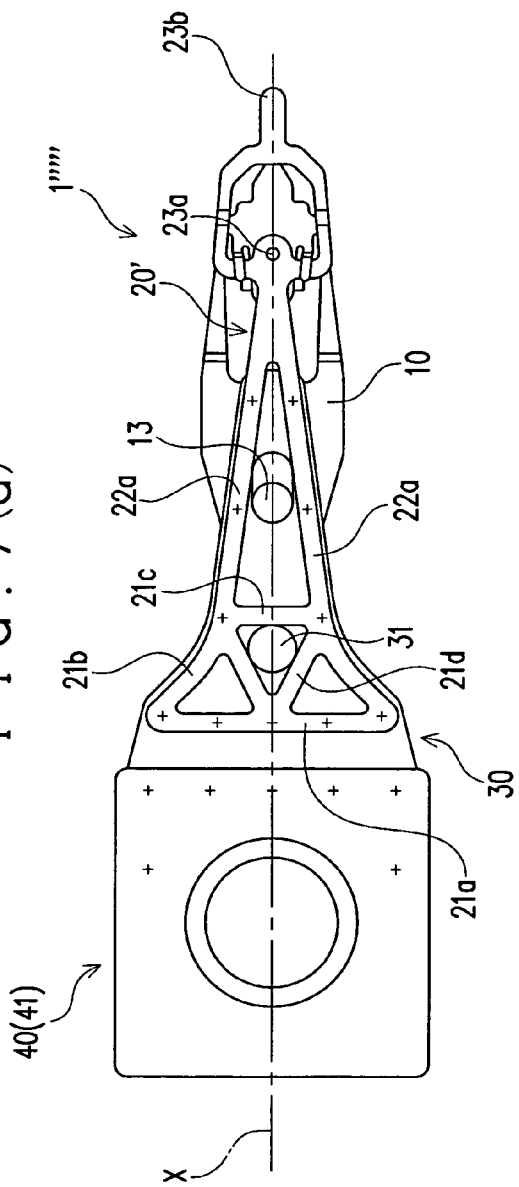
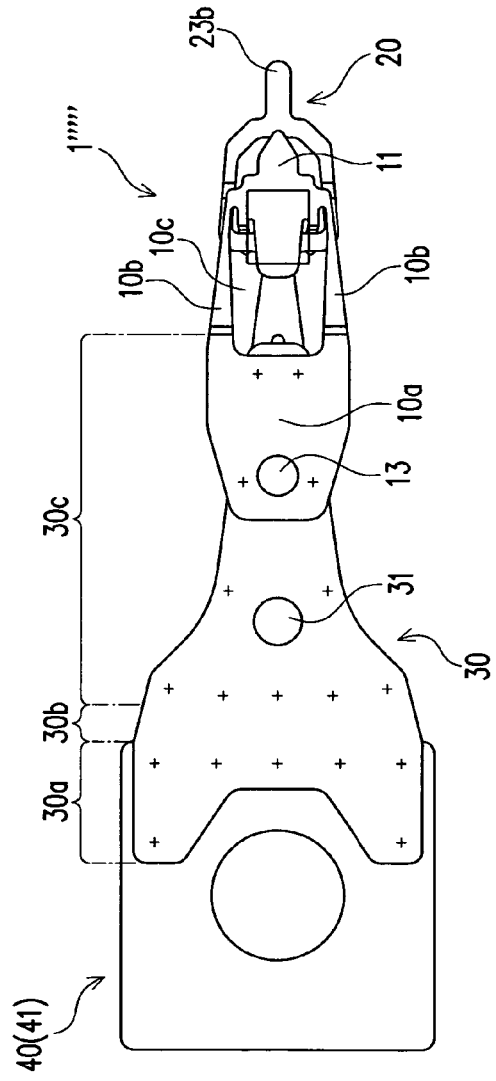
F I G. 7(a)
F I G. 7(b)

MAGNETIC HEAD SUSPENSION WITH A LOAD BEAM STRUCTURE

FIELD OF THE INVENTION

The present invention relates to a suspension for supporting a magnetic head for use in a hard-disk drive.

DISCUSSION OF THE BACKGROUND

A magnetic head suspension is required to have such a high resonance frequency in torsion mode as to allow a magnetic head to be moved at high speed in seeking direction and positioned at a target track with a high accuracy.

To increase the resonance frequency in torsion mode, it is effective to improve torsion rigidity of a load beam. However, only the employment of a thicker load beam is insufficient. That is, thickening of a load beam, which achieves increased torsion rigidity, also results in increased weight, which makes it hard to sufficiently increase the resonance frequency.

The load beam having such an increased weight also invites deterioration in impact load carrying capacity of the suspension. That is, as the weight of the load beam is increased, the maximum rate of acceleration of the load beam in a direction away from a disk surface is lowered. As a result, it is highly likely to invite damages to the disk surface due to bouncing of the load beam.

In consideration of the above matters, the specification of the U.S. Pat. No. 3,931,641 describes a load beam which was designed in attempt to simultaneously achieve improvements in resonance frequency and impact load carrying capacity by reducing the weight of the load beam by eliminating a portion of the load beam with leaving the portion necessary for a required rigidity. More specifically, the specification of the above cited U.S. patent describes a load beam having a triangular shape in plan and a hollow center. This load beam is welded to a plate material formed by an integral arrangement of a flexure and a load-bent portion (see FIG. 8). The same idea regarding the arrangement of the above cited U.S. patent is also described in Japanese Patent Application Laid-open Nos. Hei-10-031873, 2001-143422 and 2001-155458.

A load beam described in each of those cited references (see FIG. 8) is merely formed into a triangular shape in plan, and therefore hard to reduce the moment of inertia around the longitudinal axis although it can achieve an improved resonance frequency in sway mode. As a result, it is difficult to sufficiently improve the resonance frequency in torsion mode.

The present invention has been conceived in consideration of the above problems. It is an object of the present invention to provide a magnetic head suspension that is capable of improving the rigidity of the load beam while limiting increase of the weight, and increasing the resonance frequency in torsion mode.

SUMMARY OF THE INVENTION

In order to achieve the above object, according to the present invention, there is provided a magnetic head suspension comprising: a flexure having a magnetic-head mounting region; a load beam connected to the flexure; a load-bent portion having a distal end region connected to the load beam to generate a load causing a magnetic head to be pressed onto a magnetic disk; a base connected to a proximal end region of the load-bent portion; the load beam including a proximal end region connected to the distal end region of the load-bent portion, an intermediate region extending distally from the proximal end region, and a distal end region extending distally from the intermediate region to the magnetic-head mounting region; the proximal end region of the load beam provided with a proximal-end widthwise beam extending in the width direction, and a pair of proximal-end lengthwise beams respectively extending from the opposite ends of the proximal-end widthwise beam towards the distal end of the load beam, in which the pair of proximal-end lengthwise beams are inclined to a longitudinal center axis of the load beam as they advance towards the distal end of the load beam; the intermediate region of the load beam provided with a pair of intermediate lengthwise beams extending from the distal ends of the proximal-end lengthwise beams towards the distal end of the load beam, in which the pair of intermediate lengthwise beams extend in parallel to the longitudinal center axis of the load beam or are inclined to the longitudinal center axis of the load beam as they advance towards the distal end of the load beam; and the pair of proximal-end lengthwise beams having an angle of inclination relative to the longitudinal center axis of the load beam greater than the angle of inclination of the pair of intermediate lengthwise beams relative to the longitudinal center axis of the load beam.

Preferably, the proximal end region of the load beam is further provided with a reinforcing widthwise beam disposed in the width direction between the pair of proximal-end lengthwise beams for linking them together.

More preferably, the reinforcing widthwise beam is disposed between the distal ends of the pair of proximal-end lengthwise beams.

Preferably, the proximal end region of the load beam is further provided with a pair of reinforcing inclined-beams each disposed between a corresponding one of the pair of proximal-end lengthwise beams and the center of the proximal-end widthwise beam.

More preferably, the pair of reinforcing inclined-beams each are disposed between the distal end of a corresponding one of the pair of proximal-end lengthwise beams and the center of the proximal-end widthwise beam.

In a first one embodiment, the flexure and the load-bent portion are integrally formed of a single member.

In another embodiment, the flexure and the load-bent portion are separately formed of independent members.

In the latter embodiment, one of the independent member that forms the load-bent portion and another one of the independent members that forms the flexure can be disposed to have a partially overlapped region, and the load-bent portion, the load beam and the flexure are connected to each other in the partially overlapped region.

In the latter embodiment, preferably, the load beam is formed of a piezoelectric element, and the pair of intermediate lengthwise beams each have electrodes on the opposite sides of each of the pair of intermediate lengthwise beams.

Preferably, the load beam is made of metal containing iron, metal containing aluminium, metal containing titanium, or ceramic.

Preferably, the base is mounted to an E block by caulking.

Preferably, the load beam, the load-bent portion and the flexure are connected to each other by welding, and the welding is made only at junction points of the beams of the load beam.

BRIEF DESCRIPTION OF THE DRAWINGS

FIGS. 2(a) and 2(b) are respectively a top side view of a magnetic head suspension according to a second embodiment of the present invention, as viewed from the side opposite to a magnetic disk and a bottom side view thereof, as viewed from the magnetic disk side.

FIGS. 3(a) and 3(b) are respectively a top side view of a magnetic head suspension according to a third embodiment of the present invention, as viewed from the side opposite to a magnetic disk and a bottom side view thereof, as viewed from the magnetic disk side.

FIGS. 5(a) and 5(b) are respectively a top side view of a magnetic head suspension according to a fifth embodiment of the present invention, as viewed from the side opposite to a magnetic disk and a bottom side view thereof, as viewed from the magnetic disk side.

FIGS. 7(a) and 7(b) are respectively a top side view of a magnetic head suspension according to a sixth embodiment of the present invention, as viewed from the side opposite to a magnetic disk and a bottom side view thereof, as viewed from the magnetic disk side.

DETAILED DESCRIPTION OF THE PREFERRED EMBODIMENT

Embodiment 1

The description will be hereinafter made for a magnetic head suspension according to the first embodiment of the present invention with reference to the attached drawings.

Figure 1:
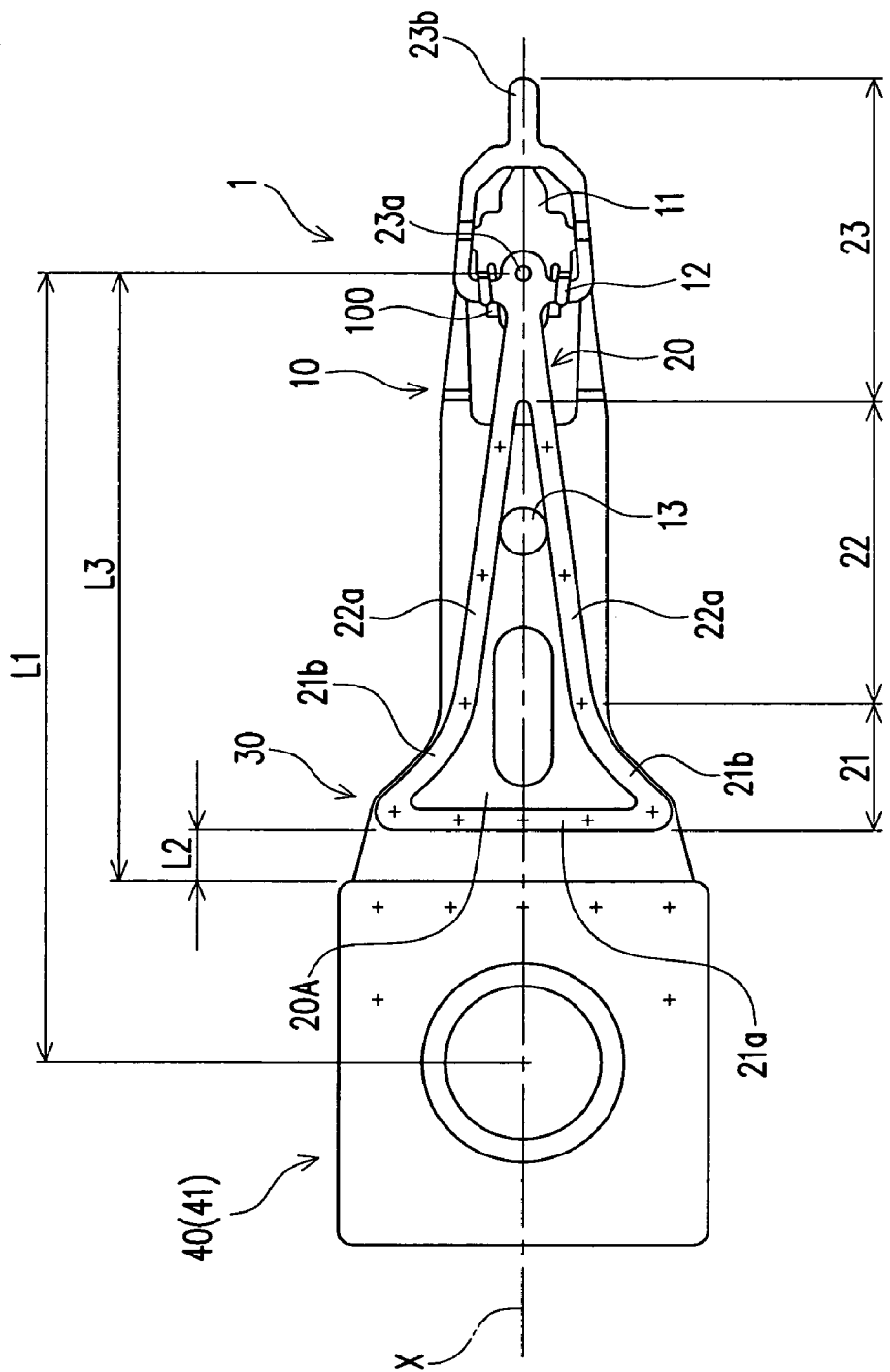
FIG. 1 is a top side view of a magnetic head suspension according to a first embodiment of the present invention, as viewed from the side opposite to a disk surface.

FIG. 1 is a top side view of a magnetic head suspension 1 of this embodiment, as viewed from the side opposite to a disk surface. In the Figure, the symbols "+" represent weld spots.

The magnetic head suspension 1 of this embodiment includes a flexure 10 having a magnetic-head mounting region 11 for supporting a magnetic head slider 100, a load beam 20 connected to the flexure 10, a load-bent portion 30 having a distal end region connected to the load beam 20 to generate a load causing the magnetic head slider 100 to be pressed against a magnetic disk, and a base 40 connected to a proximal end region of the load-bent portion 30.

The flexure 10 is formed of such as a stainless plate material having a thickness of 18 μm–25 μm and connected to the load beam 20 by welding.

The load beam 20 is formed of such as a stainless plate material having a thickness of 70 μm–200 μm. The load beam 20 is to transfer magnetic-head pressing load, which has been generated by the load-bent portion 30, to the flexure 10, as well as moving the magnetic head slider 100 in seeking direction and positioning the same at a target track. The description of the load beam 20 will be made later in detail.

The load-bent portion 30 acts as a blade spring to press the magnetic head slider 100 onto the magnetic disk against a pressure of an air film between the magnetic head slider and the surface of the magnetic disk caused by the rotation of the magnetic disk, and generate the magnetic-head pressing load, which secures a predetermined lift amount of the magnetic head slider. In this embodiment, the load-bent portion 30 is formed integrally with the flexure 10.

The base 40 is designed to be capable of supporting an assembly made up of the flexure 10, the load beam 20 and the load-bent portion 30, which are all connected to each other, and transferring driving force from an actuator to the assembly.

In this embodiment, the base 40 is in the form of a mount 41 designed to be mounted to an E block by caulking. The mount 41 is formed of such as a stainless plate material having a thickness of 0.2 mm.

The base 40 is connected with the load-bent portion 30, which is in turn connected with a proximal end region 21 of the load beam 20.

Now, the description will be made in detail for the load beam 20.

In this embodiment, the load beam 20 includes the proximal end region 21 connected to the load-bent portion 30, an intermediate region 22 extending distally from the proximal end region 21, and a distal end region 23 extending distally from the intermediate region 22 to the magnetic-head mounting region 11.

More specifically, the proximal end region 21 of the load beam 20 is provided with a proximal-end widthwise beam 21a extending in the width direction of the load beam 20, and a pair of proximal-end lengthwise beams 21b respectively extending from the opposite ends of the proximal-end widthwise beam 21a towards the distal end of the load beam.

The proximal-end widthwise beam 21a has a width of such as 0.2 mm–0.4 mm.

The pair of proximal-end lengthwise beams 21b are inclined to a longitudinal center axis X of the load beam 20 as they advance towards the distal end of the load beam 20. The pair of proximal-end lengthwise beams 21b each have a width of such as 0.2 mm–0.4 mm.

The intermediate region 22 of the load beam 20 is provided with a pair of intermediate lengthwise beams 22a extending from the distal ends of the pair of proximal-end lengthwise beams 21b towards the distal end of the load beam 20.

That is, in this embodiment, the load beam 20 defines an opening 20A in a region surrounded by the proximal-end widthwise beam 21a, the pair of proximal-end lengthwise beams 21b and the pair of intermediate lengthwise beams 22a. This opening is provided in attempt to reduce the weight of the load beam 20.

The pair of intermediate lengthwise beams 22a are inclined to the longitudinal center axis X of the load beam 20 as they advance towards the distal end of the load beam 20. The pair of intermediate lengthwise beams 22a each have a width of such as 0.2 mm–0.4 mm.

The distal end region 23 of the load beam 20 has a dimple 23a having a concave surface facing the flexure so that the magnetic-head pressing load is applied on the flexure 10 and the magnetic head slider 100 via the dimple 23a. The magnetic head slider 100 enables flexible motion in the pitch direction and the roll direction, with an apex of the dimple 23a as the center of the motion.

The distal end region 23 of the load beam 20 has a lift tab 23b adapted to abut against an inclined surface, which is also called as a ramp (not shown), when the magnetic head slider 100 is unloaded from the magnetic disk (that is, the magnetic head slider 100 is separated from the surface of the magnetic disk and moved in the radially outward direction of the magnetic disk). That is, when the lift tab 23b of the load beam 20 is lifted upward by abutting against the ramp, it is held by a hook 12 of the flexure 10. Whereby, the magnetic head slider 100 is separated from the magnetic disk.

More preferably, the flexure 10 has a first positioning hole 13 forming a circle of a given diameter tangent to the pair of intermediate lengthwise beams 22a. This positioning hole 13, into which a pin is inserted during alignment of the load beam 20 and the flexure 10, enables ease of the alignment.

Table 1 herein below shows the result of eigen-value analysis using the finite element method on the resonance frequency in a torsion-primary mode, a torsion-secondary mode and a sway mode of the thus arranged magnetic head suspension (FIG. 1).

In the above analysis, the flexure 10, the load beam 20 and the mount 41 respectively had thicknesses of 25 μm, 100 μm and 0.20 mm, while the proximal-end widthwise beam 21a, the proximal-end lengthwise beams 21b and the intermediate lengthwise beams 22a of the load beam 20 had a width of 0.3 m. A distance L1 between the center of the mount 41 and the dimple 23a was set at 11.0 mm, a distance L2 between a distal edge of the mount 41 and the proximal-end widthwise beam 21a was set at 0.70 mm, and a distance L3 between the distal edge of the mount 41 and the dimple 23a was set at 8.46 mm.

Figure 8:
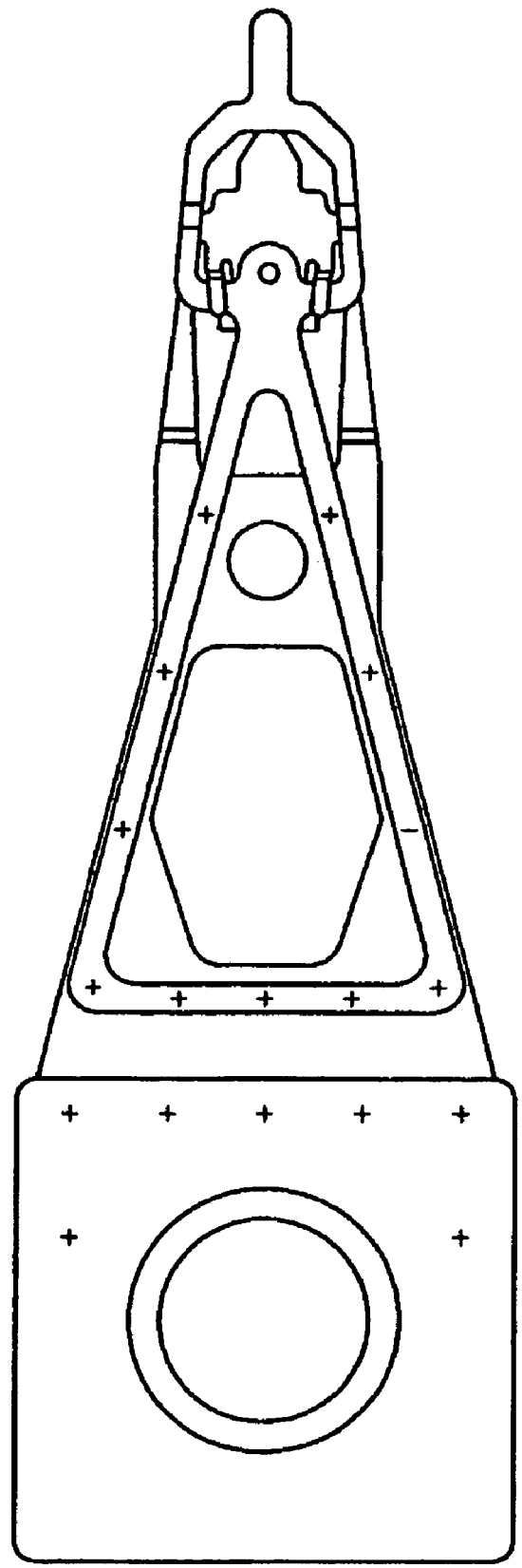
FIG. 8 is a top side view of a conventional magnetic head suspension, as viewed from the side opposite to a magnetic disk.
Figure 4:
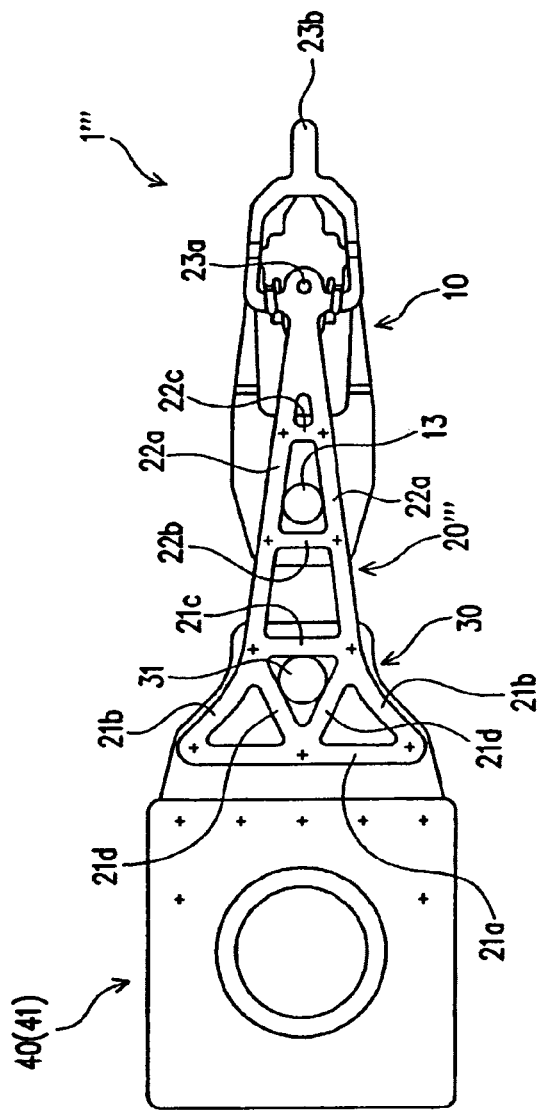

For the comparison, analysis was conducted under the same conditions for a conventional magnetic head suspension using a triangular load beam as illustrated in FIG. 8. The result of the analysis is also shown in Table 1.

TABLE 1

|  | L2 (mm) | Torsion-Primary Mode (kHz) | Torsion-Secondary Mode (kHz) | Sway Mode (kHz) |
| --- | --- | --- | --- | --- |
| Example of the Prior Art | 0.7 | 4.66 | 10.46 | 14.14 |
| Embodiment 1 | 0.7 | 5.69 | 10.65 | 12.19 |
| Embodiment 1 | 0.6 | 6.20 | 10.91 | 12.25 |
| Embodiment 2 | 0.6 | 6.42 | 11.65 | 12.48 |

As shown in TABLE 1, the magnetic head suspension 1 of this embodiment has a resonance frequency in sway mode slightly lower than the conventional magnetic head suspension of FIG. 8, but shows a remarkable improvement by about 1 kHz in resonance frequency in torsion-primary mode, which resonance frequency is likely to most greatly influence the positioning operation for the magnetic head slider 100. Also, the resonance frequency in torsion-secondary mode was increased.

The resonance frequency each in torsion-primary mode and torsion-secondary mode was increased for the following reasons.

That is, in the magnetic head suspension 1 of this embodiment, as described above, the proximal end region 21 of the load beam 20 is provided with the proximal-end widthwise beam 21a and the pair of proximal-end lengthwise beams 21b, while the intermediate region 22 of the load beam 20 is provided with the pair of intermediate lengthwise beams 22a, in which the angle of inclination of the pair of proximal-end lengthwise beams 21b relative to the longitudinal center axis X of the load beam is greater than the angle of inclination of the pair of intermediate lengthwise beams 22a relative to the longitudinal center axis X of the load beam.

The thus arranged load beam 20 can reduce the moment of inertia around the longitudinal center axis X, while having substantially the same weight as the load beam of the conventional magnetic head suspension as illustrated in FIG. 8.

Accordingly, the magnetic head suspension 1 provided with the load beam 20 can increase the resonant frequency in torsion-primary mode and torsion-secondary mode as compared with the conventional magnetic head suspension. Thus, it is possible to provide highly accurate positioning of the magnetic head slider 100.

In this embodiment, the pair of intermediate lengthwise beams 22a of the load beam 20 are inclined to the longitudinal center axis X of the load beam 20, as they advance towards the distal end of the load beam 20. Alternatively to this, the pair of intermediate lengthwise beams may be oriented substantially parallel to the longitudinal center axis X of the load beam 20. According to this alternative arrangement, although the moment of inertia around the longitudinal center axis of the load beam is slightly increased as compared to the load beam of this embodiment, but it can be sufficiently reduced as compared to the conventional load beam.

In this embodiment, as a material for making the load beam 20, stainless steel is used. Alternatively to this, pure aluminium or an alloy of aluminium and a metal such as Cu, Mg, Cr or Zn (A7075 or the like), pure titanium or an alloy of titanium and a metal such as Mo, V, Zr, Cr or Al, or ceramics such as silicon nitride, silicon carbide, zirconia or alumina is preferably used. The load beam 20 made of these materials can have a light weight as compared to the load beam made of stainless steel, thereby achieving improvement in resonant frequency and impact load carrying capacity.

Embodiment 2

The description will be hereinafter made for a magnetic head suspension according to the second embodiment of the present invention.

FIGS. 2(a) and 2(b) are respectively a top side view of a magnetic head suspension 1' according to the second embodiment of the present invention, as viewed from the side opposite to a magnetic disk and a bottom side view thereof, as viewed from the magnetic disk side.

In this embodiment, identical or corresponding parts to those of the first embodiment have been given the same reference characters to omit a detailed description thereof.

The magnetic head suspension 1' of the second embodiment has a load beam 20' in replacement of the load beam 20 used in the magnetic head suspension 1.

The proximal end region 21 of the load beam 20' has a first reinforcing widthwise beam 21c disposed between the pair of proximal-end lengthwise beams 21b for linking them together, and a pair of reinforcing inclined-beams 21d each disposed between a corresponding one of the pair of proximal-end lengthwise beams and the center of the proximal-end widthwise beam 21a for linking them together.

Preferably, the first reinforcing widthwise beam 21c is disposed between the distal ends of the pair of proximal-end lengthwise beams 21b.

Preferably, the pair of reinforcing inclined-beams 21d each are disposed between the distal end of a corresponding one of the pair of proximal-end lengthwise beams 21b and the center of the proximal-end widthwise beam 21a.

The result of eigen-value analysis using the finite element method for the resonance frequency in a torsion-primary mode, a torsion-secondary mode and a sway mode of the thus arranged magnetic head suspension 1' (FIG. 2) is also shown in Table 1.

The same conditions as those for the analysis in the first embodiment were applied, except that L2 was set at 0.60 mm.

For the comparison between the first embodiment and the second embodiment, the result of the analysis for the magnetic head suspension of the first embodiment with L2 of 0.60 mm is also shown in Table 1.

As is apparent from Table 1, the resonance frequencies of the magnetic head suspension 1' of the second embodiment in all of the torsion-primary mode, torsion-secondary mode and sway mode are higher than in the first embodiment.

This is because the load beam 20' of this embodiment has improved torsion rigidity and lateral rigidity as compared to the load beam 20 of the first embodiment.

As illustrated in FIG. 2, the load-bent portion 30 more preferably has a second positioning hole 31 forming a circle of a given diameter tangent to the first reinforcing widthwise beam 21c and the pair of reinforcing inclined-beams 21d. The thus provided second positioning hole 31 enables ease of alignment of the load beam 20' and the load-bent portion 30 at the time of welding.

In the second embodiment, the load beam 20' has the first reinforcing widthwise beam 21c and the pair of reinforcing inclined-beams 21d, while is possible to have only one of the first reinforcing widthwise beam 21c and the pair of reinforcing inclined-beams 21d.

Although in this embodiment, portions of the load beam 20', each having the lowest torsion rigidity and lateral rigidity in the load beam 20' (i.e., the crossing (junction) points between the pair of proximal-end lengthwise beams 21b and the pair of intermediate lengthwise beams 22a) are provided with the first reinforcing widthwise beam 21c and the pair of reinforcing inclined-beams 21d, the present invention is not limited to this embodiment.

Embodiment 3

The description will be hereinafter made for a magnetic head suspension according to the third embodiment of the present invention.

FIGS. 3(a) and 3(b) are respectively a top side view of a magnetic head suspension 1" according to the third embodiment of the present invention, as viewed from the side opposite to a magnetic disk and a bottom side view thereof, as viewed from the magnetic disk side.

In this embodiment, identical or corresponding parts to those of the first or second embodiment have been given the same reference characters to omit a detailed description thereof.

The magnetic head suspension 1" of this embodiment has the same arrangement as that of the magnetic head suspension 1' of the second embodiment, except that the load-bent portion 30 and the flexure 10 are respectively formed of independent members.

With the thus arranged magnetic head suspension 1", it is possible to achieve more improvement in resonance frequency than the magnetic head suspensions 1, 1' of the first and second embodiments.

Specifically, the flexure 10 preferably has a thickness of not more than 25 μm in order to achieve flexible actions of the magnetic head slider 100 in the pitch and roll directions.

On the other hand, the load-bent portion 30 preferably has a thickness of 30 μm–50 μm in order to increase the torsion rigidity.

Thus, the load-bent portion 30 and the flexure 10 can be set at different thicknesses to each have the optimum thickness, which is hardly made when the load-bent portion 30 and the flexure 10 are formed integrally with each other.

On the contrary, the magnetic head suspension 1" of this embodiment having the arrangement with the load-bent portion 30 and the flexure 10 respectively formed of the independent members can optimize the thickness of the load-bent portion 30 independently of the flexure 10. Accordingly, it is possible to further improve the resonance frequency of the suspension without limiting the operability of the magnetic head slider 100 in the pitch and roll directions.

Embodiment 4

The description will be hereinafter made for a magnetic head suspension according to the fourth embodiment of the present invention.

Figure 4:
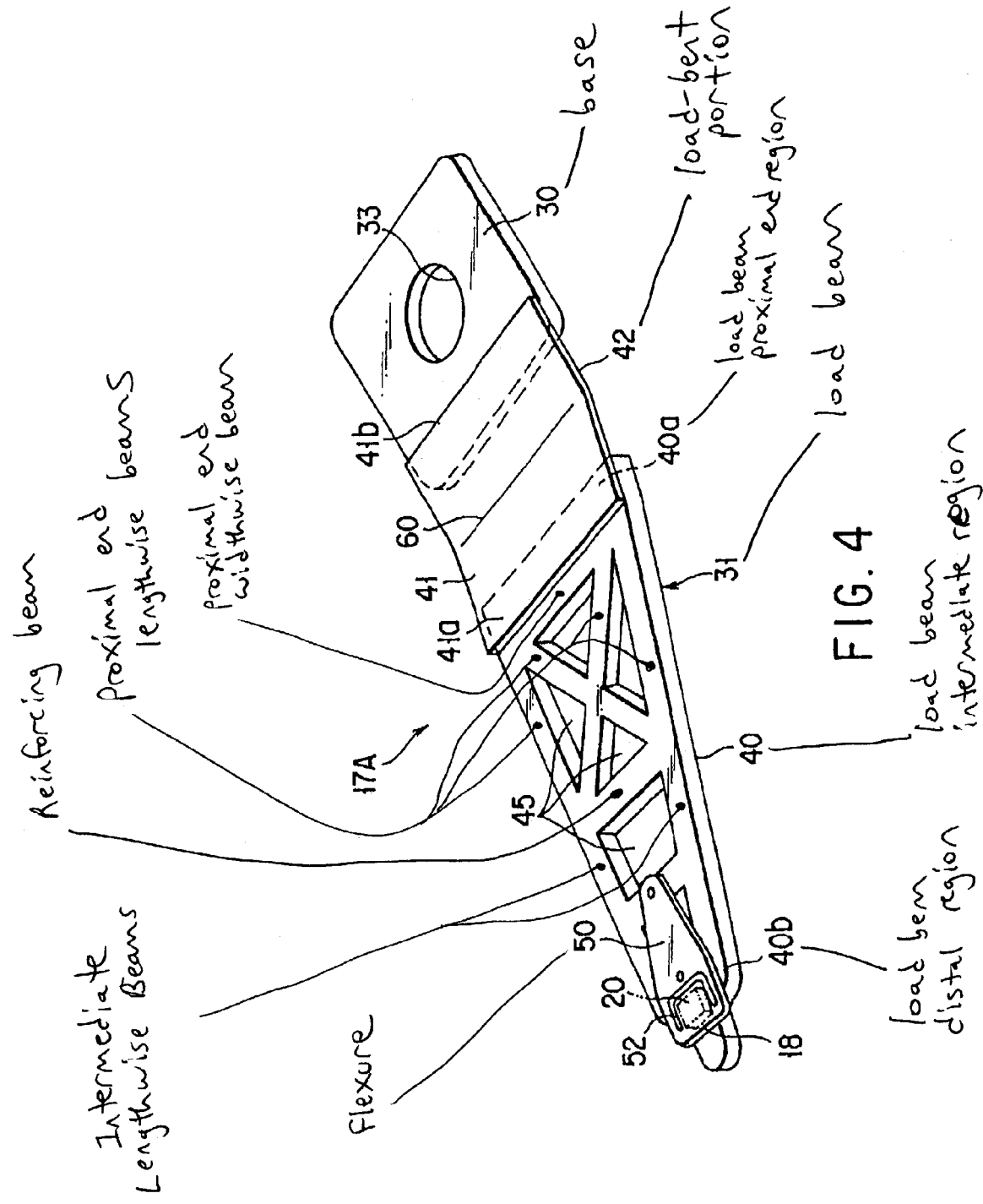
FIG. 4 is a top side view of a magnetic head suspension according to a fourth embodiment of the present invention, as viewed from the side opposite to a magnetic disk.

FIG. 4 is a top side view of a magnetic head suspension 1'" according to the fourth embodiment of the present invention, as viewed from the side opposite to a magnetic disk.

In this embodiment, identical or corresponding parts to those of the first to third embodiments have been given the same reference characters to omit a detailed description thereof.

A magnetic head suspension 1'" of the fourth embodiment has a load beam 20'" in replacement of the load beam 20' in the magnetic head suspension 1" of the third embodiment.

The load beam 20'" further has a second reinforcing widthwise beam 22b and a third reinforcing widthwise beam 22c disposed between the pair of intermediate lengthwise beams 22a for linking them together.

In the magnetic head suspension 1'" of this embodiment, connection of the load beam 20'" to the load-bent portion 30 and the flexure 10 is made by welding. They are welded at points at each of which at least two beams are linked together (each as a junction point of at least two beams).

Specifically, welding of the load beam 20'" to the flexure 10 or the load-bent portion 30 is made only at the points where the first reinforcing widthwise beam 21c, the pair of reinforcing inclined-beams 21d, the second reinforcing widthwise beam 22b and the third reinforcing widthwise beam 22c respectively cross the proximal-end widthwise beam 21a, the pair of proximal-end lengthwise beams 21b and the pair of intermediate lengthwise beams 22a.

The thus arranged magnetic head suspension 1'" can effectively limit distortion of each beam due to welds and therefore limit variation in resonance frequency characteristics.

Embodiment 5

The description will be hereinafter made for a magnetic head suspension according to the fifth embodiment of the present invention.

FIGS. 5(a) and 5(b) are respectively a top side view of a magnetic head suspension 1"" according to the fifth embodiment of the present invention, as viewed from the side opposite to a magnetic disk and a bottom side view thereof, as viewed from the magnetic disk side.

In this embodiment, identical or corresponding parts to those of the first to fourth embodiments have been given the same reference characters to omit a detailed description thereof.

The magnetic head suspension 1"" of this embodiment has a load beam 20"" in replacement of the load beam 20' in the magnetic head suspension 1" of the third embodiment.

The load beam 20"" is formed of a piezoelectric element such as PZT and provided in each of the pair of intermediate lengthwise beams 22a of the intermediate region 22 with electrodes 25 on the opposite sides thereof (e.g., the upper and lower sides). The electrodes 25 each is formed of such as an Au thin film having a thickness of 0.1 μm–0.5 μm.

With the thus arranged magnetic head suspension 1"", one of the pair of intermediate lengthwise beams 22a can be elongated in the lengthwise direction, while another one of them be shrunk in the lengthwise direction by applying opposite voltages respectively to the electrodes 25 of the pair of intermediate lengthwise beams 22a.

Thus, the magnetic head suspension 1""of this embodiment enables the pair of intermediate lengthwise beams 22a to be operated as a fine actuator. This allows the magnetic head slider 100 to achieve micro displacement movement (e.g., about 1 μm) in the lateral direction (seeking direction), and hence achieves the positioning of the head with a higher accuracy.

In this embodiment, connection of the load beam 20"" to the flexure 10 and the load-bent portion 30 may be made not by welding but bonding.

In the above embodiments, the description was made by taking for example the case where the mount 41 is used as the base. It is a matter of course that the present invention is not necessarily limited to this embodiment.

Figure 6:
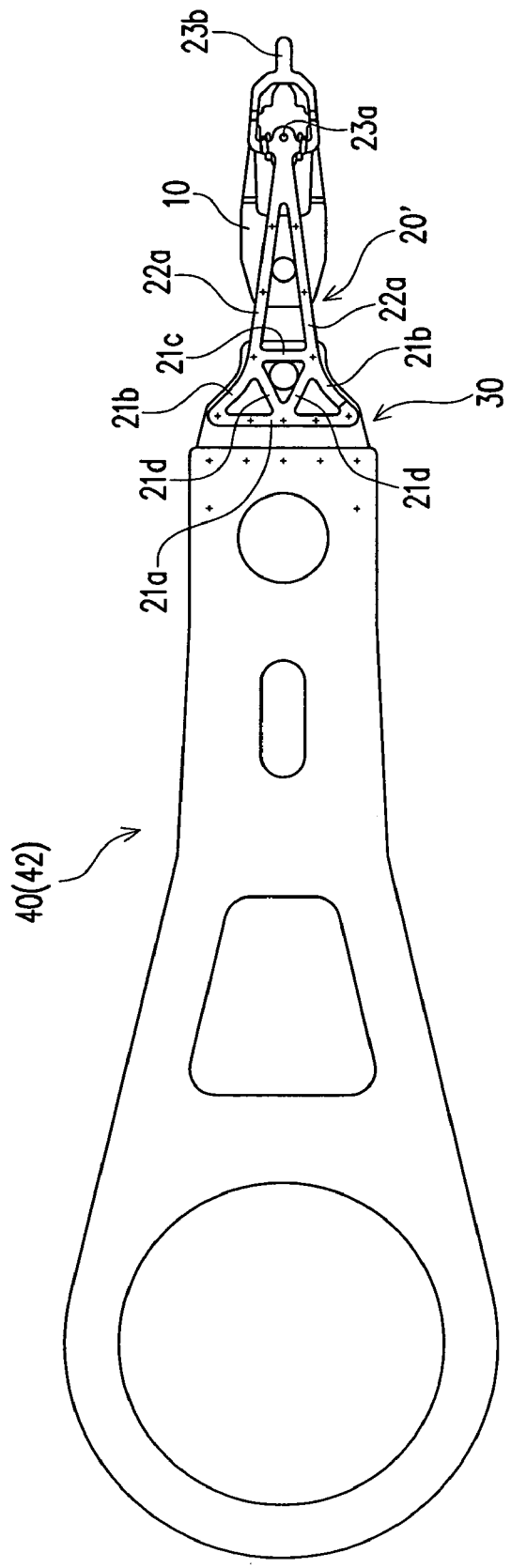
FIG. 6 is a top side view of a magnetic head suspension with an arm used as a base, as viewed from the side opposite to a magnetic disk.

That is, as illustrated in FIG. 6, it is possible to use an arm 42 as the base 40, which is directly mounted to a bearing of a voice coil motor. In the embodiment as illustrated in FIG. 6, necessity to connect the magnetic head suspension to the E block by caulking can be omitted. As a result, a hard-disk fabrication process can be simplified.

Embodiment 6

The description will be hereinafter made for a magnetic head suspension according to the sixth embodiment of the present invention.

FIGS. 7(a) and 7(b) are respectively a top side view of a magnetic head suspension 1"""" according to the sixth embodiment of the present invention, as viewed from the side opposite to a magnetic disk and a bottom side view thereof, as viewed from the magnetic disk side.

In this embodiment, identical or corresponding parts to those of the first to fifth embodiments have been given the same reference characters to omit a detailed description thereof.

The magnetic head suspension 1"""" of this embodiment is provided with the load-bent portion 30 and the flexure 10 respectively formed of the independent members in the same manner as the third embodiment.

However, the magnetic head suspension 1"""" of this embodiment is different from the third embodiment in the arrangement where the load-bent portion 30 and the flexure 10 are partially overlapped with each other.

Specifically, in the same manner as the third embodiment, the load-bent portion 30 of this embodiment has a proximal end region 30a connected to the base 40, a load-bent region 30b distally extending from this proximal end region 30a and a distal end region 30c distally extending from this load-bent region 30b, in which a part of the distal end region 30c is overlapped with the flexure 10.

That is, in the magnetic head suspension 1"""" of this embodiment, the load-bent portion 30, the flexure 10 and the load beam 20 formed independently of each other are overlapped and connected with each other in an intermediate region of the load beam. The connection of these members may be made by laser beam welding or the like.

In addition to the effects produced in the third embodiment, the following effects can be produced in this embodiment.

That is, it is possible to increase the rigidity of the intermediate region of the load beam 20 and effectively reduce vibrations of the load beam due to air flows generated by the rotation of the disk in a hard-disk unit. As a result, it is possible to limit the displacement of the magnetic head from the track due to vibrations of the load beam.

Preferably, as illustrated in FIGS. 7, the overlapped portion of the load-bent portion 30 and the flexure 10 has a layered structure with the load beam 20, the load-bent portion 30 and the flexure 10 stacked in order from the upper side to the lower side.

In the above preferred embodiment, it is possible to effectively prevent causing a stepped portion on the connection surface relative to the load-bent portion 30 of the load beam 20.

More preferably, the distal end region 30c of the load-bent portion 30 extends to an opening region 10c of the flexure 10.

Specifically, the flexure has a proximal end region 10a, a pair of arms 10b distally extending from the opposite lateral ends of the proximal end region 10a, and the magnetic-head mounting region 11 supported by free ends of the pair of arms, while forming the hollow opening region 10c between the pair of arms 10b.

With the above arrangement, it is possible to more effectively prevent causing a stepped portion on the connection surface of the load beam 20.

As described above, in the magnetic head suspension according to the present invention, the proximal end region of the load beam is provided with the proximal-end widthwise beam extending in the width direction of the load beam, and the pair of proximal-end lengthwise beams respectively extending from the opposite ends of the proximal-end widthwise beam and are inclined to the longitudinal center axis of the load beam as they advance towards the distal end of the load beam; the intermediate region of the load beam is provided with the pair of intermediate lengthwise beams 22a extending from the distal ends of the pair of proximal-end lengthwise beams 21b towards the distal end of the load beam in parallel to the longitudinal center axis of the load beam or being inclined to the longitudinal center axis of the load beam as they advance towards the distal end of the load beam; and the angle of inclination of the pair of proximal-end lengthwise beams relative to the longitudinal center axis is greater than the angle of inclination of the pair of intermediate lengthwise beams relative to the longitudinal center axis. With this arrangement, it is possible to improve the resonance frequency in torsion mode without increasing the weight of the load beam.

By providing the reinforcing widthwise beam between the pair of proximal-end lengthwise beams and/or the pair of reinforcing inclined-beams each disposed between a corresponding one of the pair of proximal-end lengthwise beams and the center of the proximal-end widthwise beam, the resonance frequency in torsion mode can be further improved.

Also, by forming the load-bent portion and the flexure independently of each other, the thickness of the load-bent portion can be optimized independently of the flexure, and hence the resonance frequency can be further improved.

With the arrangement where the load beam is welded to the flexure only at points at each of which at least two beams are linked together (each as a junction point of at least two beams), distortion of the beams due to welds can be effectively limited and hence variation in resonance frequency characteristics can be limited.

What is claimed is:

1. A magnetic head suspension comprising:
   a flexure having a magnetic-head mounting region;
   a load beam connected to said flexure;
   a load-bent portion having a distal end region connected to said load beam to generate a load causing a magnetic head to be pressed onto a magnetic disk;
   a base connected to a proximal end region of said load-bent portion;
   said load beam including a proximal end region connected to the distal end region of said load-bent portion, an intermediate region extending distally from said proximal end region, and a distal end region extending distally from said intermediate region to said magnetic-head mounting region;
   said proximal end region of said load beam provided with a proximal-end widthwise beam extending in the width direction, and first and second proximal-end lengthwise beams respectively extending from opposite ends of the proximal-end widthwise beam towards the distal end of the load beam so as to be positioned on one side and on an opposite side with respect to a longitudinal center axis of said load beam, respectively, in which said first and second proximal-end lengthwise beams are inclined to the longitudinal center axis of the load beam as they advance towards the distal end of the load beam;
   said intermediate region of said load beam provided with first and second intermediate lengthwise beams respectively extending from the distal ends of the first and second proximal-end lengthwise beams towards the distal end of the load beam, so that a space enclosed by said proximal-end widthwise beam, said first and second proximal-end lengthwise beams, and said first and second intermediate lengthwise beams defines an opening, in which said first and second intermediate lengthwise beams extend in parallel to the longitudinal center axis of the load beam or are inclined to the longitudinal center axis of the load beam as they advance towards the distal end of the load beam; and
   said first and second proximal-end lengthwise beams having an angle of inclination relative to the longitudinal center axis of the load beam greater than an angle of inclination of said first and second intermediate lengthwise beams relative to the longitudinal center axis of the load beam, respectively.

2. The magnetic head suspension according to claim 1, wherein said proximal end region of said load beam is further provided with a reinforcing widthwise beam disposed in the width direction between said first and second proximal-end lengthwise beams for linking them together.

3. The magnetic head suspension according to claim 2, wherein said reinforcing widthwise beam is disposed between the distal ends of said first and second proximal-end lengthwise beams for linking them together.

4. The magnetic head suspension according to claim 1, wherein said proximal end region of said load beam is further provided with a pair of reinforcing inclined-beams each disposed between a corresponding one of said first and second proximal-end lengthwise beams and the center of said proximal-end widthwise beam.

5. The magnetic head suspension according to claim 4, wherein said pair of reinforcing inclined-beams each are disposed between the distal end of a corresponding one of said first and second proximal-end lengthwise beams and the center of said proximal-end widthwise beam.

6. The magnetic head suspension according to claim 1, wherein said flexure and said load-bent portion are integrally formed of a single member.

7. The magnetic head suspension according to claim 1, wherein said flexure and said load-bent portion are separately formed of independent members.

8. The magnetic head suspension according to claim 7, wherein said load beam is formed of a piezoelectric element, and said first and second intermediate lengthwise beams each have electrodes on the opposite sides of each of said first and second intermediate lengthwise beams.

9. The magnetic head suspension according to claim 7, wherein one of said independent members that forms said load-bent portion and another one of said independent members that forms said flexure are disposed to have a partially overlapped region, and said load-bent portion, said load beam and said flexure are connected to each other in said partially overlapped region.

10. The magnetic head suspension according to claim 1, wherein said load beam is made of metal containing iron.

11. The magnetic head suspension according to claim 1, wherein said load beam is made of metal containing aluminium.

12. The magnetic head suspension according to claim 1, wherein said load beam is made of metal containing titanium.

13. The magnetic head suspension according to claim 1, wherein said load beam is made of ceramic.

14. The magnetic head suspension according to claim 1, wherein said base is mounted to an E block by caulking.

15. The magnetic head suspension according to claim 1, wherein said load beam, said load-bent portion and said flexure are connected to each other by welding, and said welding is made only at junction points of said beams of said load beam.

* * * * *

UNITED STATES PATENT AND TRADEMARK OFFICE
CERTIFICATE OF CORRECTION

PATENT NO. : 6,989,968 B2
DATED : January 24, 2006
INVENTOR(S) : Takasugi et al.

It is certified that error appears in the above-identified patent and that said Letters Patent is hereby corrected as shown below:

<u>Drawings,</u>
Delete Figure 4 of sheet 4, and insert the Figure 4 attached.

Signed and Sealed this

Thirteenth Day of June, 2006

JON W. DUDAS
*Director of the United States Patent and Trademark Office*